US010109023B2

(12) United States Patent
Shah et al.

(10) Patent No.: US 10,109,023 B2
(45) Date of Patent: Oct. 23, 2018

(54) SOCIAL MEDIA EVENTS DETECTION AND VERIFICATION

(71) Applicant: Thomson Reuters Global Resources Unlimited Company, Baar (CH)

(72) Inventors: Sameena Shah, White Plains, NY (US); Xiaomo Lu, Forest Hills, NY (US); Qi Li, Pittsburg, PA (US); Reginald Chua, New York, NY (US); Armineh Nourbakhsh, Brooklyn, NY (US); Quanzhi Li, Mountainside, NJ (US); Rui Fang, Rego Park, NY (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 209 days.

(21) Appl. No.: 15/143,730

(22) Filed: May 2, 2016

(65) Prior Publication Data

US 2016/0328482 A1 Nov. 10, 2016

Related U.S. Application Data

(60) Provisional application No. 62/158,609, filed on May 8, 2015, provisional application No. 62/186,419, filed on Jun. 30, 2015.

(51) Int. Cl.
*G06F 17/30* (2006.01)
*G06Q 50/00* (2012.01)
*G06Q 10/10* (2012.01)

(52) U.S. Cl.
CPC ....... *G06Q 50/01* (2013.01); *G06F 17/30867* (2013.01); *G06Q 10/10* (2013.01)

(58) Field of Classification Search
CPC ......... G06F 17/30867; G06F 17/30598; G06F 17/30528; G06F 17/30; G06F 17/27;
(Continued)

(56) References Cited

U.S. PATENT DOCUMENTS 8,762,302 B1 * 6/2014 Spivack ................ G06N 5/046
706/12
2008/0021925 A1 1/2008 Sweeney
(Continued)

FOREIGN PATENT DOCUMENTS

WO 2016/057378 A1 4/2016
WO 2016/182774 A1 11/2016

OTHER PUBLICATIONS

International Search Report and Written Opinion issued in corresponding PCT Application No. PCT/US2016/030357, dated Jul. 29, 2016, 8 pages.
(Continued)

*Primary Examiner* — Anh Ly
(74) *Attorney, Agent, or Firm* — Bartholomew J. DiVita

(57) ABSTRACT

Systems and techniques for detecting and verifying social media events are disclosed. The system and techniques allow for processing of social media data to extract potentially valuable information in a timely manner and determine the veracity of the detected information. One implementation of the disclosure relates to event detection. Event detection involves ingestion and processing of social media data. Another implementation of the disclosure relates to verification of a detected event and generating a verification score.

23 Claims, 23 Drawing Sheets

(58) Field of Classification Search
CPC ........... G06F 17/3053; G06F 17/30321; G06F 17/30554; G06F 21/6218; G06F 17/30601; G06F 17/30525; G06F 17/30091; G06F 17/30038; G06F 17/241; G06F 17/30743; G06F 50/00; G06Q 10/10; G06Q 10/063; G06Q 50/01; G06Q 17/3012; G06Q 17/300914; G06N 99/10; G06N 7/005; G11B 27/036; H04L 21/8106; H04L 21/435; H04L 65/4015
See application file for complete search history.

(56) References Cited

U.S. PATENT DOCUMENTS

| | | | |
|---|---|---|---|
| 2008/0124686 A1* | 5/2008 | Forman | G09B 7/02 434/219 |
| 2010/0121843 A1* | 5/2010 | Goeldi | G06Q 10/00 707/722 |
| 2011/0282855 A1* | 11/2011 | Ronen | G06F 17/30637 707/706 |
| 2011/0282943 A1 | 11/2011 | Anderson et al. | |
| 2012/0059901 A1 | 3/2012 | Tsai | |
| 2012/0079020 A1 | 3/2012 | Park et al. | |
| 2012/0136865 A1 | 5/2012 | Blom et al. | |
| 2013/0103389 A1 | 4/2013 | Gattani et al. | |
| 2013/0191898 A1* | 7/2013 | Kraft | G06F 21/31 726/6 |
| 2013/0218862 A1 | 8/2013 | Ghosh et al. | |
| 2013/0268260 A1* | 10/2013 | Lundberg | G06F 17/28 704/8 |
| 2013/0290208 A1* | 10/2013 | Bonmassar | G06Q 10/1053 705/321 |
| 2013/0297694 A1 | 11/2013 | Ghosh | |
| 2013/0304726 A1 | 11/2013 | Sandulescu et al. | |
| 2013/0340076 A1* | 12/2013 | Cecchetti | G06F 21/55 717/123 |
| 2014/0040371 A1 | 2/2014 | Gurevich et al. | |
| 2014/0081636 A1 | 3/2014 | Erhart et al. | |
| 2014/0085328 A1 | 3/2014 | Codella et al. | |
| 2014/0201227 A1 | 7/2014 | Hamilton-Dick et al. | |
| 2014/0214670 A1* | 7/2014 | McKenna | G06Q 20/40145 705/44 |
| 2014/0214819 A1 | 7/2014 | Aitchison | |
| 2014/0236916 A1 | 8/2014 | Barrington et al. | |
| 2014/0337257 A1* | 11/2014 | Chatterjee | G06N 99/005 706/12 |
| 2015/0081713 A1 | 3/2015 | Alonso et al. | |
| 2015/0120502 A1* | 4/2015 | Jung | G06Q 30/0613 705/26.41 |
| 2015/0128222 A1* | 5/2015 | Festa | H04L 63/126 726/4 |
| 2015/0264518 A1 | 9/2015 | Dal Santo et al. | |
| 2016/0019301 A1* | 1/2016 | Goldenstein | G06F 17/30867 707/722 |
| 2016/0026919 A1* | 1/2016 | Kaisser | G06Q 10/06 706/12 |
| 2016/0055164 A1* | 2/2016 | Cantarero | G06F 17/30064 707/740 |
| 2016/0203498 A1* | 7/2016 | Das | G06Q 30/02 705/7.29 |

OTHER PUBLICATIONS

International Preliminary Report on Patentability issued in corresponding PCT Application No. PCT/US2016/030357, dated Nov. 23, 2017, 8 pages.
International Search Report and Written Opinion issued in corresponding PCT Application No. PCT/US2017/052998, dated Nov. 27, 2017, 11 pages.
International Search Report and Written Opinion issued in corresponding PCT Application No. PCT/US2017/057216, dated Jan. 12, 2018, 17 pages.
International Search Report and Written Opinion issued in corresponding PCT Application No. PCT/US2017/059533, dated Jan. 4, 2018, 9 pages.
Collobert et al., "Natural Language Processing (Almost) from Scratch", Journal of Machine Learning Research 12, 2011, pp. 2493-2537.
Li et al., "Real-Time Novel Event Detection from Social Media", IEEE International Conference on Data Engineering (ICDE 2017), 11 pages.
McMinn et al., "Building a Large-scale Corpus for Evaluating Event Detection on Twitter", CIKM'13, Oct. 27-Nov. 1, 2013, San Francisco, CA, USA, 10 pages.
Petrovic et al., "Using paraphrases for improving first story detection in news and Twitter", Proceedings of the 2012 Conference of the North American Chapter of the Association for Computational Linguistics: Human Language Technologies, Montreal, Canada, 2012, pp. 338-346.
Owoputi et al., "Improved Part-of-Speech Tagging for Online Conversational Text with Word Clusters", Proceedings of NAACL, 2013, pp. 380-390.
Allan et al., "First Story Detection in TDT Is Hard", Proceedings of the ninth international conference on Information and knowledge management, Virginia, USA, 2000, pp. 374-381.
Castillo et al., Information Credibility on Twitter. WWW 2011, Mar. 28-Apr. 1, 2011, Hyderabad, India. ACM 978-1-4503-0632-4/11/03, pp. 675 to 684.
Gupta et al., Faking Sandy: Characterizing and Identifying Fake Images on Twitter during Hurricane Sandy. WWW 2013 Companion, May 13-17, 2013, Rio de Janeiro, Brazil. ACM 978-1-4503-2038-2/13/05.
Boididou et al., Challenges of Computational Verification in Social Multimedia. WWW'14 Companion, Apr. 7-11, 2014, Seoul, Korea, ACM 978-1-4503-2745-9/14/04, http://dx.doi.org/10.1145/2567948. 2579323. pp. 743 to 748.
Finn et al., Investigating Rumor Propagation with Twitter Trails. http://cs.wellesley.edu/~pmetaxas/TwitterTrails-investigating-rumor-propagation.pdf.
Leskovec et al., Meme-tracking and the Dynamics of the News Cycle, KDD '09 Paris, France Copyright 200X ACM X-XXXXX-XX-X/XX/XX . . . $5.00.
Ratkiewicz et al., Detecting and Tracking Political Abuse in Social Media. Proceedings of the Fifth International AAAI conference on Weblogs and Social Media. pp. 297 to 304.
Ennals et al., Highlighting Disputed Claims on the Web. WWW 2010, Apr. 26-30, 2010, Raleigh, North Carolina, USA, ACM 978-1-60558-799-8/10/04.
Osborne et al., Real-Time Detection, Tracking, and Monitoring of Automatically Discovered Events in Social Media. Proceedings of 52nd Annual Meeting of the Association for Computational Linguistics: System Demonstrations, pp. 37-42, Baltimore, Maryland USA, Jun. 23-24, 2014.
Preotiuc-Pietro, et al., A temporal model of text periodicities using Gaussian Processes. Proceedings of the 2013 Conference on Empirical Methods in Natural Language Processing, pp. 977-988, Seattle, Washington, USA, Oct. 18-21, 2013.
Friggeri et al., Rumor Cascades. Proceedings of the Eighth International AAAI Conference on Weblogs and Social Media, pp. 101 to 110.
Mendoza et al., Twitter Under Crisis: Can we trust what we RT? 1st Workshop on Social Media Analytics (SOMA '10), Jul. 25, 2010, Washington, DC, USA. Copyright 2010 ACM 978-1-4503-0217-3 . . . $10.00.
Petrovic, et al., Streaming First Story Detection with application to Twitter. http://homepages.inf.ed.ac.uk/miles/papers/naacl10a.pdf.
Qazvinian, et al., Rumor has it: Identifying Misinformation in Microblogs. Proceedings of the 2011 Conference on Empirical Methods in Natural Language Processing, pp. 1589-1599, Edinburgh, Scotland, UK, Jul. 27-31, 2011.
Wu, et al., False Rumors Detection on Sina Weibo by Propagation Structures. http://www.cs.sjtu.edu.cn/~kzhu/papers/kzhu-rumor.pdf.

(56) References Cited

OTHER PUBLICATIONS

Yu, et al., Automatic Detection of Rumor on Sina Weibo, permission and/or a fee. MDS'12 Aug. 12, 2012, Beijing, China, Copyright 2012 ACM 978-1-4503-1546-3/12/08 . . . $10.00.
Sun, et al., Detecting event rumors on sine weibo automatically. In Web Technologies and Applications, pp. 120-131. Springer, 2013.
Extended European Search Report received for European Patent Application No. 16793181.5 dated Aug. 21, 2018, 11 pages.
Wikipedia: "Data processing system", Internet Article, May 1, 2015, Retrieved from the Internet: URL: https://en.wikipedia.org/w/index.php?title=Dataprocessing_system&oldid=60221914, [retrieved on Aug. 10, 2018], 4 pages.
Wikipedia: "Big data", Internet Article, May 6, 2015, Retrieved from the Internet: URL: https://en.wikipedia.org/w/index.php?title=Big_ data&oldid=661105738, [retrieved on Aug. 10, 2018], 22 pages.
Wikipedia: "Social network aggregation", Internet Article, Mar. 23, 2015, Retrieved from the Internet: URL: https://en.wikipedia.org/w/index.php?title=Social_network_aggregation&oldid=653153041, [retrieved on Aug. 10, 2018], 3 pages.
Wikipedia: "Mobile Web", Internet Article, Mar. 27, 2015, Retrieved from the Internet:URL: https://en.wikipedia.org/w/index.php?title=Mobile_Web&oldid=653815098, [retrieved on Feb. 24, 2016], 6 pages.
Grainger et al., "Solr in Action", Mar. 9, 2014, Manning Publications Co., 28 pages.
Marmanis et al., "Algorithms of the Intelligent Web", Jul. 8, 2009, Manning Publications, 369 pages.
Ibsen et al., "Camel in Action", Dec. 31, 2010, Manning Publications Co., 122 pages.
Russell, Matthew A. "Mining the Social Web: Data Mining Facebook, Twitter, Linkedin, Google+, GitHub and More", O'Reilly Oct. 20, 2013, 430 pages.
Cielen et al., "Introducing Data Science: Big Data, Machine Learning and more, using Python tools", Mar. 3, 2015, Manning Publications, vol. MEAP v2, 25 pages.

* cited by examiner

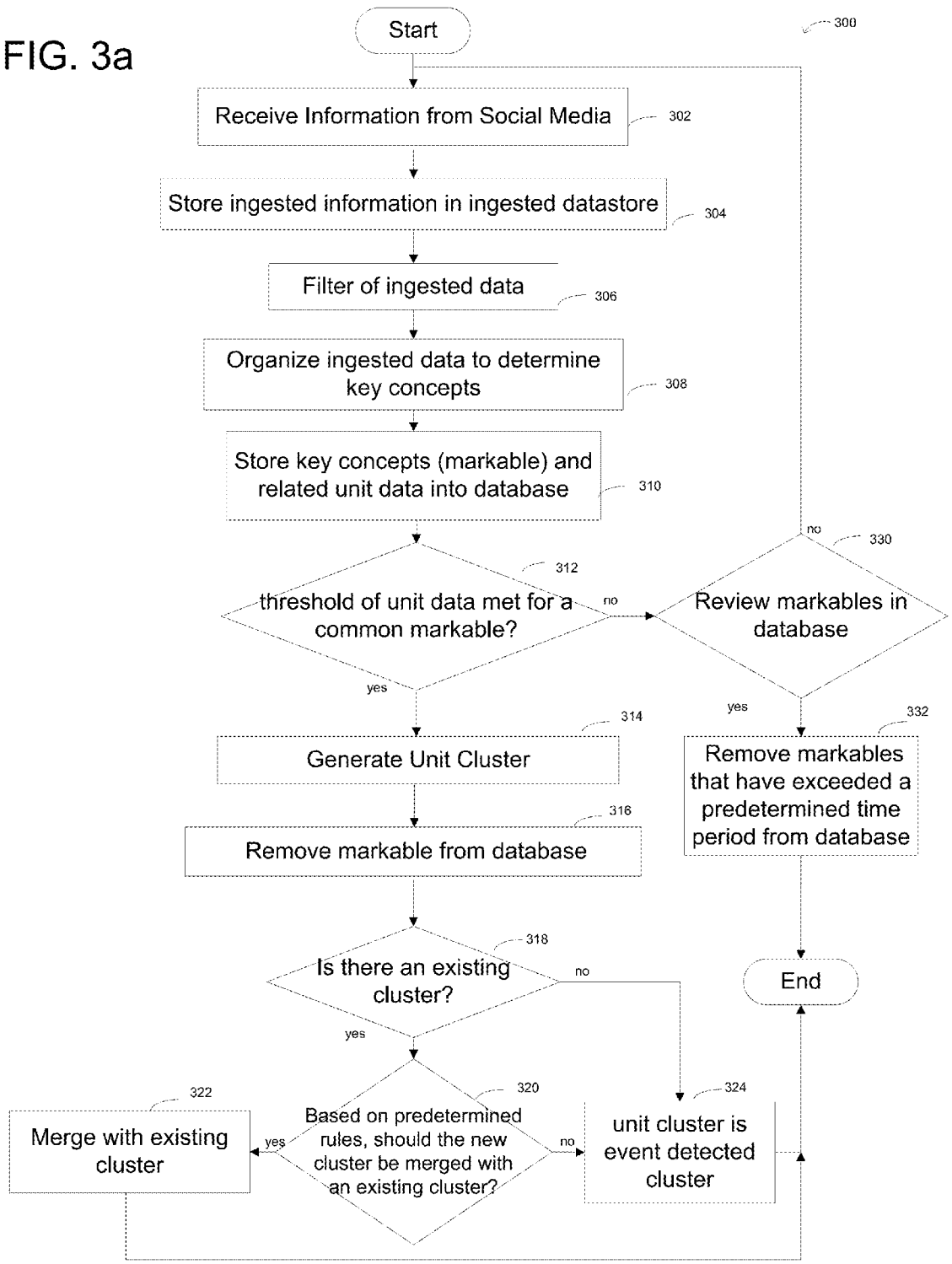

Table 1: Description of Features

| Category | Feature Name | Feature Type | Feature Description |
|---|---|---|---|
| User | HAS NAME | Boolean | If the author has name |
| User | HAS DESCRIPTION | Boolean | If the author has description |
| User | USER HAS URL | Boolean | If the author has URL |
| User | HAS LOCATION | Boolean | If the author has location |
| User | MATCHES CLUSTER LOCATION | Boolean | If the author location matches event location |
| User | IS WITNESS | Boolean | If the author is the witness of the event |
| User | IS PROTECTED | Boolean | If the author is protected |
| User | IS VERIFIED | Boolean | If the author is verified |
| Tweet-level | HAS MULTIMEDIA | Boolean | If the tweet contains multimedia |
| Tweet-level | HAS ELONGATED WORD | Boolean | If the tweet has elongated word |
| Tweet-level | TWEET HAS URL | Boolean | If the tweet has url |
| Tweet-level | HAS NEWS URL | Boolean | If the tweet has url from news organization |
| Tweet-level | NUMBER SENTIMENT POSITIVE WORDS | NUMERICAL | number of positive sentiment word |
| Tweet-level | NUMBER SENTIMENT NEGATIVE WORDS | NUMERICAL | number of negative sentiment word |
| Tweet-level | SENTIMENT SCORE | NUMERICAL | the sentiment score of the tweet |
| Event | EVENT TOPIC | CATEGORICAL | The topic of the event |
| Event | MOST RETWEET CNT | NUMERICAL | the count of the most retweeted tweets |
| Event | RETWEET SUM | NUMERICAL | the sum of number of retweeted tweets |
| Event | HASHTAG SUM | NUMERICAL | the sum of number of hashtags |
| Event | NEGATION FRACTION | NUMERICAL | the fraction of tweets that deny the event |
| Event | SUPPORT FRACTION | NUMERICAL | the fraction of tweets that believe the event |
| Event | QUESTION FRACTION | NUMERICAL | the fraction of tweets that question the event |

```
{
"_index": "blip2016.03.04",
"_type": "twitter",
"_id": "72ea1b70e23411e5a6f5fa163ee42fcd",
"_score": null,
"_source": {
"user_handle": "jackstarr1999",
"friends_count": 9976,
"source": "<a href=\"http://twitterfeed.com\" rel=\"nofollow\">twitterfeed</a>",
"favorite_count": 0,
"content_type": "Twitter",
"urls": [
{
"expanded_url": "http://bbc.in/1Yaj7V0",
"indices": {
"first": 114,
"second": 137
},
"url": "https://t.co/ZIsuqo6Nri",
"domain": "bbc.in",
"display_url": "bbc.in/1Yaj7V0",
"is_short_url": false
}
],
"followers_count": 13262,
"is_retweet": false,
"text": "Mugabe: Foreign firms 'stole diamonds': Zimbabwean President Robert Mugabe
accuses foreign mining companies of... https://t.co/ZIsuqo6Nri",
"retweet_count": 0,
"user_id": "268036007",
"id": "72ea1b70e23411e5a6f5fa163ee42fcd",
"language": "en",
"raw": {
"coordinates": null,
"retweeted": false,
"source": "<a href=\"http://twitterfeed.com\" rel=\"nofollow\">twitterfeed</a>",
"entities": {
"hashtags": [],
"urls": [
{
"url": "https://t.co/ZIsuqo6Nri",
```

FIG. 5f

```
"expanded_url": "http://bbc.in/1Yaj7V0",
"display_url": "bbc.in/1Yaj7V0",
"indices": [
114,
137
]
}
},
"user_mentions": [],
"symbols": []
},
"favorite_count": 0,
"in_reply_to_status_id_str": null,
"geo": null,
"id_str": "705817833658142720",
"in_reply_to_user_id": null,
"timestamp_ms": "1457115059662",
"truncated": false,
"text": "Mugabe: Foreign firms 'stole diamonds': Zimbabwean President Robert Mugabe
accuses foreign mining companies of... https://t.co/ZIsuqo6Nri",
"retweet_count": 0,
"id": 705817833658142700,
"in_reply_to_status_id": null,
"possibly_sensitive": false,
"filter_level": "low",
"created_at": "Fri Mar 04 18:10:59 +0000 2016",
"place": null,
"favorited": false,
"lang": "en",
"contributors": null,
"in_reply_to_screen_name": null,
"is_quote_status": false,
"in_reply_to_user_id_str": null,
"user": {
"utc_offset": 28800,
"name": "jackstarr1999",
"friends_count": 9976,
"screen_name": "jackstarr1999",
"location": "Looking Ahead Maryland",
"protected": false,
"url": null,
```

FIG. 5g

```
"profile_image_url":
"http://pbs.twimg.com/profile_images/3419216884/5fb506f5bfea5ed0b99c2cfa24849c81_normal
.jpeg",
"profile_background_color": "C0DEED",
"profile_use_background_image": true,
"is_translator": false,
"geo_enabled": false,
"description": "buzzing about all kinds of stuff do
say hello trying
to stay positive here",
"profile_link_color": "9EB300",
"id_str": "268036007",
"listed_count": 107,
"default_profile_image": false,
"followers_count": 13262,
"profile_image_url_https":
"https://pbs.twimg.com/profile_images/3419216884/5fb506f5bfea5ed0b99c2cfa24849c81_norm
al.jpeg",
"profile_sidebar_border_color": "EBC1C1",
"profile_background_image_url":
"http://pbs.twimg.com/profile_background_images/219169952/2.jpg",
"favourites_count": 494,
"following": null,
"default_profile": false,
"id": 268036007,
"profile_background_tile": true,
"contributors_enabled": false,
"follow_request_sent": null,
"created_at": "Fri Mar 18 01:18:56 +0000 2011",
"profile_sidebar_fill_color": "DDEEF6",
"lang": "en",
"profile_text_color": "333333",
"notifications": null,
"verified": false,
"time_zone": "Tijuana",
"profile_banner_url": "https://pbs.twimg.com/profile_banners/268036007/1363413391",
"statuses_count": 94782,
"profile_background_image_url_https":
"https://pbs.twimg.com/profile_background_images/219169952/2.jpg"
}
},
"date": "20160304T18:
10:59.000Z",
"possibly_sensitive": false,
"source_id": "705817833658142720",
```

FIG. 5h

```
            "metadata": {
            "threat_score": 0,
            "channels": [
            "Legal Risks"
            ],
    ┌────── "sdp.sane.credibility": {
535         "tweet": 0.6819980807625843,
            "user": 3,
            "composite": 2.045994242287753
            },
    ┌────── "has_profanity": false,            ────── 534
524         "sdp.sane.fact_opinion": {
            "class": "f",
            "score": 0.7770599430360502
            },
            "tokens": {
            "TERM": [
    ┌────── "Mugabe",
526         "Foreign",
            "firms",
            "stole",
            "diamonds",
            "Zimbabwean",
            "President",
            "Robert",
            "Mugabe",
            "accuses",
            "foreign",
            "mining",
            "companies",
            "of"
            ],
            "MONEY": [],
            "ALL": [
            "Mugabe",
            "Foreign",
            "firms",
            "stole",
            "diamonds",
            "Zimbabwean",
            "President",
            "Robert",
            "Mugabe",
            "accuses",
```

FIG. 5i

```
"foreign",
"mining",
"companies",
"of",
",",
"",
"",
".",
" "
...,
"https://t.co/ZIsuqo6Nri",
",",
"",
"",
".",
" "
...
],
"ENTITY": [
"https://t.co/ZIsuqo6Nri"
],
"JUNK": [
",",
"",
"",
".",
" "
...
],
"EMOTICON": [],
"PUNC": [
",",
"",
"",
".",
" "
...
],
"EMOJI": [],
"CRISIS": []
},
"origins": [
"onepctpublic",
"onepctfilter"
],
"sdp.sane.spam_category": "news like"
},
```

FIG. 5j

```
"user": {
"name": "jackstarr1999",
"friends_count": 9976,
"screen_name": "jackstarr1999",
"location": "Looking Ahead Maryland",
"description": "buzzing about all kinds of stuff do
say hello trying
to stay positive here",
"listed_count": 107,
"user_avatar":
"http://pbs.twimg.com/profile_images/3419216884/
5fb506f5bfea5ed0b99c2cfa24849c81_normal
.jpeg",
"followers_count": 13262,
"is_verified": false,
"favourites_count": 494,
"is_default_profile": false,
"has_profile_image": true,
"id": "268036007",
"language": "en",
"created_at": "20110318T01:
18:56.000Z",
"statuses_count": 94782,
"is_protected": false
}
},
"fields": {
"raw.user.created_at": [
1300411136000
],
"raw.timestamp_ms": [
1457115059662
],
"date": [
1457115059000
],
"user.created_at": [
1300411136000
],
"raw.created_at": [
1457115059000
]
},
"sort": [
1457115059000
]
}
```

FIG. 5k

```
{
"_id" : ObjectId("56d9d362498e88c331ace10d"),
"cluster_id" : "705817833658142720",
"created_at" : ISODate("20160304T18:
26:41Z"),
"server_created_at" : ISODate("20160304T18:
26:42.203Z"),
"first_tweeted_at" : ISODate("20160304T18:
10:59Z"),
"merged_at" : ISODate("20160304T18:
26:41Z"),
"news_score" : 0.970382710245269,
"cluster_size" : 3,
"tweet_count" : 3,
"retweet_count" : 0,
"verify_sort" : 1,
"merge_count" : 1,
"verify_count" : 1,
"topic" : "POLITICS",
"summary" : "Mugabe: Foreign firms 'stole diamonds': Zimbabwean President
Robert
Mugabe accuses foreign mining companies of...",
"channels" : [ ],
"tweets" : [
"705817833658142720",
"705821784696696832",
"705817993037553664"
],
"proper_nouns" : [
{
"token" : "robert_mugabe",
"ids" : [
"705817833658142720",
"705821784696696832",
"705817993037553664"
]
},
{
"token" : "mugabe",
"ids" : [
"705817833658142720",
"705821784696696832",
"705817993037553664"
]
}
],
```

533 — "cluster_size"
531 — "topic"
532 — "summary"
504a — "proper_nouns"
506a — "ids"

FIG. 5I

```
"hashtags" : [
{
"token" : "news",
"ids" : [
"705821784696696832"
]
}
],
"ticker_symbols" : [ ],
"additional_tokens" : [
{
"token" : "companies",
"tag_type" : "COMMON_NOUN",
"ids" : [
"705817833658142720",
"705817993037553664"
]
},
{
"token" : "mining",
"tag_type" : "COMMON_NOUN",
"ids" : [
"705817833658142720",
"705821784696696832",
"705817993037553664"
]
},
{
"token" : "president",
"tag_type" : "COMMON_NOUN",
"ids" : [
"705817833658142720",
"705821784696696832",
"705817993037553664"
]
},
{
"token" : "diamonds",
"tag_type" : "COMMON_NOUN",
"ids" : [
"705817833658142720",
"705821784696696832",
"705817993037553664"
]
},
{
"token" : "firms",
"tag_type" : "COMMON_NOUN",
"ids" : [
"705817833658142720",
"705821784696696832",
"705817993037553664"
]
}
],
```

FIG. 5m

```
"urls" : [
"http://bit.ly/bbcNews",
"http://bbc.in/1Yaj7V0"
],
"unit_clusters" : [
{
"tweets" : [
"705817833658142720",
"705817993037553664",    506b
"705821784696696832"
],
"merged_at" :
ISODate("20160304T18:
26:41Z")
}
],
"locations" : [ ],
"merge_history" : [
{
"date" : ISODate("20160304T18:
26:41Z"),
"merge_id" : 1
}
],
"retweet_hierarchy" : [
{
"parent" : "705817833658142720",
"size" : 0,
"children" : [ ]
},
{
"parent" : "705821784696696832",
"size" : 0,
"children" : [ ]
},
{
"parent" : "705817993037553664",
"size" : 0,
"children" : [ ]
}
],
"verify_history" : [
{
"date" : ISODate("20160304T18:
26:41Z"),
"score" : 1
}
],
"verifiability" : true
}
```

SOCIAL MEDIA EVENTS DETECTION AND VERIFICATION

CROSS-REFERENCE TO RELATED APPLICATION

This application claims priority to U.S. Provisional Application No. 62/158,609, filed May 8, 2015, entitled "DEBUNKING RUMORS IN TWITTER BEFORE NEWS ORGANIZATIONS" and U.S. Provisional Application No. 62/186,419, filed Jun. 30, 2015, entitled "SYSTEM AND METHOD FOR AUTOMATICALLY DETECTING AND VERIFYING SOCIAL MEDIA EVENTS". Each of the applications referred to in this paragraph is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright @ 2015 Thomson Reuters.

TECHNICAL FIELD

This disclosure relates to event detection and verification, and more particularly methods and systems for detecting and verifying an event from social media data.

BACKGROUND

Social media platforms like Twitter® or Facebook®, have influenced news gathering. Every minute, people around the world are posting pictures, videos, tweeting and otherwise communicating about all sorts of events and happenings. For example, a person may comment on what they see at a scene of an accident in real-time. Since people geographically close to an event are a valuable source of breaking news, the information generated by them is potentially very valuable. However, leveraging such information is very difficult.

According to statistics on the Twitter® website, there are approximately 320 million twitter users, of which, 65 million are in the United States and 254 million internationally (Twitter Q4 2015 Earnings Report, pp. 4). There are also approximately 350,000 tweets per minute. The percentage of valuable information is very small compared to the entire social media data available at a time. It has been noted that social media data primarily includes rumors, noise, spam, and mostly information useless to a professional consumer. As a result, potentially useful information is very hard to discover. Furthermore, discovery of useful information does not assure accuracy of the claimed event.

Currently, the tools in the marketplace take a bottom-up approach to tackling extraction of information from social media. Users interested in niche information may search by keywords or maintain broad databases of people to follow in hope to capture useful information from social media data. This bottom-up approach of information extraction requires guess work and constant maintenance of lists and keywords.

Accordingly, improved systems and techniques are needed that detect emerging trends at the social media data level and verify the authenticity of the emerging trends.

SUMMARY

Systems and techniques for detecting and verifying social media events are disclosed. The system and techniques allow for processing of social media data to extract potentially valuable information in a timely manner and determine the veracity of the detected information.

One aspect of the disclosure relates to event detection. Event detection involves ingestion and processing of social media data. For example, according to one aspect, a method includes receiving, by an event detecting server, social media data from at least one data source and applying, by the event detecting server, a set of filters to the social media data to generate a data store (i.e. a database or hashmap), the data store comprising a set of identified concepts and corresponding attributes of the social media data. The method also includes selecting, by the event detecting server, one of the set of identified concepts from the database using a corresponding threshold value associated with the attributes of the social media data and generating, by the event detecting server, an event cluster using the selected identified concept. The method may further include deleting by the event detecting server, the selected identified concept from the database.

In one implementation, the method also includes detecting language of the social media data and removing the social media data that is not in English. In another implementation, the method also includes detecting profanity used in the social media data and removes the social media data containing the detected profanity. In yet another implementation, the method may include detecting at least one of spam, chat and advertisement in the social media data and removing the social media data that contains the at least one detected spam, chat and advertisement.

In a further implementation, the method includes applying Parts-Of-Speech tagging of the social media data. In an alternative implementation, the method may include analyzing semantic and syntactic structures in the social media data to determine identified concepts in the social media data.

A threshold value may be used for selection of one of the set of identified concepts from the database and may be associated with a selectable number of distinct attributes (i.e., three distinct attributes) of the social media data related to the identified concept. In one implementation, one of the attributes of the social media data is an authorship value (i.e., the user) and the corresponding threshold value represents a predetermined number (i.e., three) of similar identified concepts associated with different authorship values (i.e., different users).

In yet a further implementation, the method includes but is not limited to generating a newsworthy score, a topic classification, a summary, and a credibility score for each cluster and its corresponding data.

In one implementation, for example, the method further includes generating a verification score for each cluster and its corresponding data, the verification score is indicative of the veracity or accuracy of each assertion in the cluster. The veracity score and event clusters may be provided to the user on a graphical user interface.

In one implementation, the veracity score is determined by analyzing user category, social media level and event features.

The user category comprises, but is not limited to, determining at least one of name of author, description of author, URL of author, location of author, location of the author matching the location of the event, author being a witness to the event, protection level of the author's account, and verification of the author, associated with each item of the social media data.

The social media level comprises, but is not limited to, determining at least one of multimedia, url, elongated word, url from news source, and word sentiment associated with the social medial data.

The event features comprises, but is not limited to, determining at least one of topic of the event and portion of the social media that deny, believe or question the event associated with each item of the social media data.

In a further implementation, wherein the social media data is twitter data, the event features further comprises determining at least one of a count of the most retweeted tweets, a frequency of retweeted tweets and a frequency of hashtags associated with each item of the social media data.

Systems, devices, as well as articles that include a machine-readable medium storing machine-readable instructions for implementing the various techniques, are disclosed. Details of various implementations are discussed in greater detail below.

One advantage relates to accuracy and speed. For example, in one implementation, using the above systems and techniques, collective users may be able to predict the veracity of an event with approximately 85% accuracy and faster than mainstream media can confirm the same information.

Additional features and advantages will be readily apparent from the following detailed description, the accompanying drawings and the claims.

BRIEF DESCRIPTION OF THE DRAWINGS

FIG. 3a is an exemplary flow chart of one implementation of the disclosure;

FIG. 4a illustrates exemplary elements in a veracity calculation;

FIG. 5a illustrates an exemplary processing of an item of social media data;

FIG. 5b illustrates an example table representation of mapping key concepts to the respective social media data;

FIG. 5c illustrates an example database representation in relation to the exemplary social media data of FIG. 5a;

FIGS. 5f-5k is an exemplary metadata of ingested data in FIG. 5e;

FIGS. 5l-5n is an exemplary metadata of an event detected cluster with ingested data of FIG. 5e as one of the related unit data;

DETAILED DESCRIPTION

In the following description, reference is made to the accompanying drawings that form a part hereof, and in which is shown by way of illustration specific implementations in which the disclosure may be practiced. It is to be understood that other implementations may be utilized and structural changes may be made without departing from the scope of the present disclosure.

Figure 1:
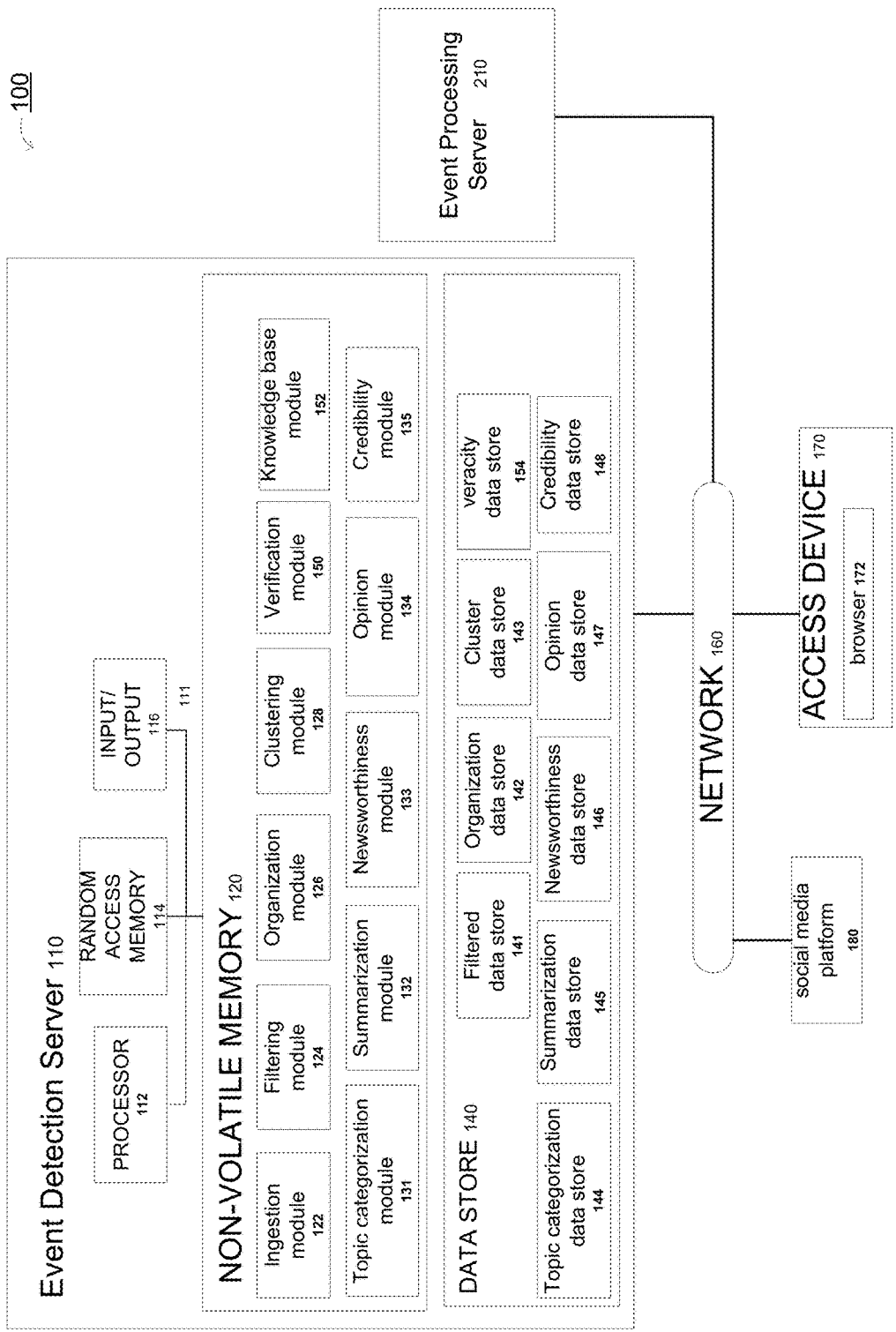
FIG. 1 is an exemplary architectural diagram of the system.
Figure 2:
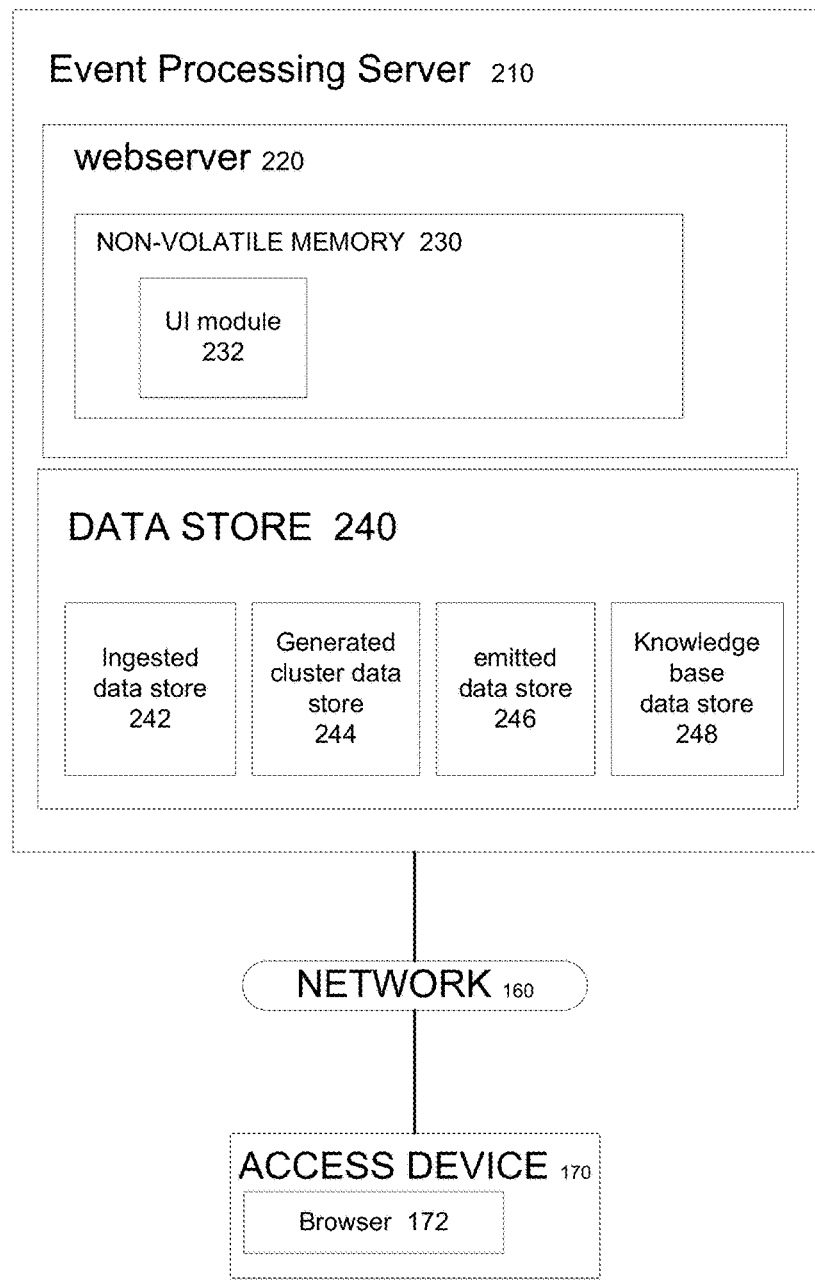
FIG. 2 is an exemplary event processing server.

FIG. 1 shows an exemplary system 100 for detecting and verifying an event from social media data. As shown in FIG. 1, in one implementation, the system 100 is configured to include an event detection server 110 that is in communication with a social media platform 180 over a network 160. The system 100 further comprises an access device 170 that is in communication with an event processing server 210 over the network 160. Further details of an exemplary event processing server 210 are illustrated in FIG. 2. The event detection server 110 is in communication with the event processing server 210 over the network 160. Access device 170 can include a personal computer, laptop computer, or other type of electronic device, such as a mobile phone, smart phone, tablet, PDA or PDA phone. In one implementation, for example, the access device 170 is coupled to I/O devices (not shown) that include a keyboard in combination with a point device such as a mouse for sending an event request to the event processing server 210. Preferably, the access device 170 is configured to include a browser 172 that is used to request and receive information from the event processing server 210. Communication between the browser 172 of the access device 170 and event processing server 210 may utilize one or more networking protocols, which may include HTTP, HTTPS, RTSP, or RTMP. Although one access device 170 is shown in FIG. 1, the system 100 can support one or multiple access devices.

The network 160 can include various devices such as routers, servers, and switching elements connected in an Intranet, Extranet or Internet configuration. In some implementations, the network 160 uses wired communications to transfer information between the access device 170 and the event processing server 210, the social media platform 180 and the event detection server 110. In another implementation, the network 160 employs wireless communication protocols. In yet other implementations, the network 160 employs a combination of wired and wireless technologies.

As shown in FIG. 1, in one implementation, the event detection server 110, may be a special purpose server, and preferably includes a processor 112, such as a central processing unit ('CPU'), random access memory ('RAM') 114, input-output devices 116, such as a display device (not shown), and non-volatile memory 120, all of which are interconnect via a common bus 111 and controlled by the processor 112.

In one implementation, as shown in the FIG. 1 example, the non-volatile memory 120 is configured to include an ingestion module 122 for receiving social media data from the social media platform 180. Exemplary social media platforms are, but not limited to, Twitter®, Reddit®, Facebook®, Instagram® or LinkedIn®. As used herein, the phase "ingested data" refers to received social media data, which may be but is not limited to, tweets and/or online messages, from the social media platform 180.

The non-volatile memory 120 also includes a filtering module 124 for processing ingested data. In one implementation, processing of the ingested data may comprise but is not limited to, detecting language of the ingested data and filtering out ingested data that contains profanity, spam, chat and advertisements.

The non-volatile memory 120 is also configured to include an organization module 126 for analyzing semantic and syntactic structures in the ingested data. In one implementation, the organization module 126 may apply part-of-speech tagging of the ingested data. In another implementation, the organization module 126 detects key concepts included in the ingested data.

As shown in the FIG. 1 example, the non-volatile memory 120 may also be configured to include a clustering module 128 for storing key concepts identified by the organization module 126 into a database, an example of which may be but is not limited to a hashmap, and generating an event detected cluster upon reaching a threshold of distinct ingested data containing common key concepts.

The non-volatile memory 120 is also further configured to include a topic categorization module 131 for classifying the event detected cluster by topics; a summarization module 132 for selecting a representative description for the event detected cluster; and a newsworthiness module 133 for determining a newsworthy score to indicate the importance of the event detected cluster.

The non-volatile memory 120 is also configured to include an opinion module 134 for detecting if the each ingested data in the event detected cluster contains an opinion of a particular person or is factual (e.g., non-opinionated tone), and a credibility module 135, for determining the credibility score of the ingested data. In one implementation, the credibility score is associated with three components: user/source credibility: who is providing the information, cluster credibility: what is the information, and tweet credibility: how is the information related to other information.

The non-volatile memory 120 is further configured to include verification module 150 for determining the accuracy of the event detected cluster. In one implementation, verification may be done by a veracity algorithm which generates a veracity score. In another implementation, the verification module 150 may generate a probability score for an assertion being true based on evidences collected from ingested data.

The non-volatile memory 120 is further configured to include a knowledge base module 152 for developing a database of information pertaining to credible sources and stores the information in a knowledge base data store 248 (FIG. 2).

As shown in the exemplary FIG. 1, a data store 140 is provided that is utilized by one or more of the software modules 124, 126, 128, 131, 132, 133, 134, 135, 150, 152 to access and store information relating to the ingested data. In one implementation, the data store 140 is a relational database. In another implementation, the data store 140 is a file server. In yet other implementations, the data store 140 is a configured area in the non-volatile memory 120 of the event detection server 110. Although the data store 140 shown in FIG. 1 is part of the event detection server 110, it will be appreciated by one skilled in the art that the data store 140 can be distributed across various servers and be accessible to the server 110 over the network 160. As shown in FIG. 1, in one implementation, the data store 140 is configured to include a filtered data store 141, an organization data store 142, a cluster data store 143, a topic categorization data store 144, a summarization data store 145, a newsworthiness data store 146, an opinion fact data store 147, a credibility data store 148 and a veracity data store 154.

The filtered data store 141 includes ingested data that has been processed by the filtering module 124. For example, in one implementation, the ingested data processed by filtering module 124 may be English language tweets that do not contain profanity, advertisements, spam, chat or advertisement.

The organization data store 142 includes ingested data that has been processed by the organization module 126. In one implementation, the ingested data in organization data store 142 may include parts-of-speech tagging notations or identified key concepts, which are stored as a part of ingested data metadata.

The cluster data store 143 includes ingested data that has been processed by filtering module 124 and organization module 126 and is queued to be formed into a cluster. In a further implementation, the cluster data store 143 may also contain a data store or database of key concepts (e.g. hashmap) identified by the organization module 126 matched to corresponding ingested data. As used herein with relation to the database of key concepts, ingested data (e.g., tweets and/or online messages) may also be referred to as unit data.

The topic categorization data store 144 includes the classification of the event detected cluster determined by the topic categorization module 131. Exemplary topics may include but are not limited to business/finance, technology/science, politics, sports, entertainment, health/medical, crisis(war/disaster), weather, law/crime, life/society, and other.

The summarization data store 145 includes a selected unit data that is representative of the event detected cluster as determined by the summarization module 132.

The newsworthiness data store 146 includes the newsworthy score computed by newsworthiness module 133. For example, a higher score would imply that the event detected cluster is likely to be important from a journalistic standard.

The opinion data store 147 includes information pertaining to the determination by the opinion module 134 of whether a given unit data comprises an opinion of a particular person or an assertion of a fact.

The credibility data store 148 includes a credibility or confidence score as determined by the credibility module 135.

The veracity data store 154 includes metrics generated by the verification module 150 regarding the level of accuracy of the event detected cluster. In one implementation, it may be the veracity score determined through a veracity algorithm. In another implementation, it may be a verification score indicating the probability of accuracy based on all the evidences collected from social media.

In a further implementation, as shown in FIG. 1, the Event Processing Server 210 includes a processor (not shown), random access memory (not shown) and non-volatile memory (not shown) which are interconnected via a common bus and controlled by the processor. In one implementation, the Event Processing Server 210 is responsible for storing processed information generated or to be used by the Event Detection Server 110. In another implementation, the Event Processing Server 210 also communicates directly with the user. The Event Processing Server 210 is further illustrated in relation to FIG. 2.

It should be noted that the system 100 shown in FIG. 1 is one implementation of the disclosure. Other system implementations of the disclosure may include additional structures that are not shown, such as secondary storage and additional computational devices. In addition, various other implementations of the disclosure include fewer structures than those shown in FIG. 1.

Turning now to FIG. 2, the Event Processing Server 210 in one implementation contains a web server 220 with a non-volatile memory 230 and a UI (user interface) module 232.

The UI module 232 communicates with the access device 170 over the network 160 via a browser 172. The UI module 232 may present to a user through the browser 172 detected events clusters and their associated metadata. Exemplary associated metadata may be but are not limited to the topic, newsworthiness indication and verification score associated with one or more event detected clusters.

The event processing server 210 may further comprise a data store 240 to host an ingested data store 242, a generated cluster data store 244, an emitted data store 246 and the knowledge base data store 248.

The ingested data store 242 includes ingested data received from social platform 180 and processed by ingestion module 122.

The generated cluster datastore 244 includes the event detected clusters that have been processed by modules 122, 124, 126, 128, 131, 132, 133, 134, 135 and 150.

The emitted data store 246 includes key concepts and corresponding ingested data that were discarded by the clustering module 128, as explained in relation to steps 330-332 of FIG. 3a. In an alternative implementation, the emitted data store may be located in the event detection server 110.

The knowledge base data store 248 includes a list of credible sources as determined by knowledge base module 152.

In one implementation, the Event Processing Server 210 communicates with the Event Detection Server 110 over the network 160. In another implementation, the Event Processing Server 210 is included in the nonvolatile memory 120 of Event Detection Server 110. In yet another implementation, the Event Processing Server 210 is configured to communicate directly with the Event Detection Server 110. An exemplary event processing server 210 may be but is not limited to MongoDB® or ElasticSearch®.

Referring now to FIG. 3, an exemplary method 300 of detecting and verifying social media events is disclosed. As shown in the FIG. 3, at step 302, information from social media platform 180 is retrieved by the ingestion module 122 of event detection server 110. In one implementation, the ingestion module 122 may include scripts or code that interface with the social media platform 180 application API. The scripts or code are also able to request and pull information from the APIs. In another implementation, the ingestion module 122 may determine the location of the ingested data and the user and append location information as metadata to the ingested data.

Next at step 304, upon receiving the ingested data, the ingestion module 122 stores the ingested data into the ingested data store 242 of event processing server 210. In a further implementation, metadata may also be generated by the ingestion module 122 and appended to the ingested data prior to storage in the ingested data store 242.

In an alternative implementation, the knowledge base module 152 may compile the list of credible sources using information gathered from the ingested data. The knowledge base module 152 stores the list of credible sources in the knowledge base data store 248. In one implementation, the knowledge base module 152 may analyze user profiles from the ingested data to capture information such as user affiliations or geography to be used for compilation of the list of credible sources. In a further implementation, the knowledge base module 152 takes established credible users and reviews lists generated by the user for relevant information that may be used to generate the list of credible sources. For example, if a credible user has a tech list containing a list of tech users, user IDs and related information (e.g., a related tech list associated with the user ID) associated with the tech users are also mined for information. The knowledge base module 152 continually updates knowledge base data store 248 as further social media data are ingested and may be evaluated at a predetermined frequency to ensure the information is current.

Continuing onto step 306, the filtering module 124 retrieves the ingested data from ingested data store 242 and processes the ingested data. Exemplary processing by the filtering module 124 may include language detection and profanity detection. In one implementation, the filtering module 124 determines the language of the ingested data and eliminates ingested data that are not in English. In an alternative implementation, elimination of ingested data can be for other languages.

The filtering module 124 may also detect profane terms in the ingested data and flag the ingested data that contains profanity. Ingested data containing profanity is then eliminated by the filtering module 124. In one implementation, the detection of profanity is based on querying a dictionary set of profane terms.

In a further implementation, the filtering module 124 may utilize a classification algorithm that removes ingested data that is recognized to be spam, chat or advertisements. Exemplary indication of spam would be ingested data saying "follow me @xyz". Exemplary chat in ingested data may be general chatter about daily lives like "good morning". Exemplary advertisements in ingested data may contain language such as "click here to buy this superb T-shirt for $10." In one implementation, the classification algorithm is based on a machine learning model that has been trained on a number of features based on language (i.e., terms used in constructing the data), message quality (i.e., presence of capitalization, emoticons), user features (i.e., average registration age). Exemplary machine learning models include, but are not limited to, Support Vector Machines, Random Forests, and Regression Models. The filtered ingested data is then stored in filtered data store 141.

Once filtering has been completed by the filtering module 124, at step 308, the organization module 126 retrieves the now filtered ingested data from filtered data store 141 and detects key concepts in the ingested data. In one implementation, the organization module 126 detects semantic and syntactic structures in the ingested data.

In another implementation, the organization module 126 may apply part-of-speech tagging, through a Part-Of-Speech tagger, on the ingested data. For example, the organization module 126 recognizes verbs, adverbs, proper nouns, and adjectives in the ingested data. In a further implementation, there may be a predefined list of terms used for recognition by the organization module 126 that includes, but are not limited to, crisis terms like "fire," "tornado", or "blast". The predefined list of terms may also be further customized based on concepts that are not proper nouns but are a good proxy for the main context of the ingested data.

Part-of-speech tagging notations or identified key concepts may then be stored into the organization data store 142. In one implementation, the Part-of-speech tagging notations or identified key concepts may be appended to the ingested data metadata and stored into the organization data store 142.

All key concepts, proper nouns, hashtags, and any list terms found in the ingested data are designated as a 'markable'. In a further implementation, the markable may be further concatenated to produce markables that are more meaningful. For example, if "New" followed by "York" has been identified as a markable, then the terms are concatenated to indicate the revised markable as "New_York" and removing individual "New" and "York".

Once the key concepts are identified by the organization module 126, the clustering module 128 at step 310, obtains organized ingested data from organization data store 142 and creates a database of key concepts with a reference to the corresponding ingested data. In one implementation, the referenced corresponding ingested data maybe in the form of a unit data. This database is then stored in cluster data store 143.

At step 312, each key concept has a predefined time frame to grow to a minimum count of unit data required to be considered an unit cluster or else it is discarded. An exemplary threshold count, may be but is not limited to, three (3) unit data for a key concept. To illustrate, if collective users (i.e., authorship value) are mentioning similar key concepts in their social media data, there maybe a likelihood of an emerging event.

Once a threshold number of unit data containing common markables have been met, in step 314, the clustering module 128 generates a unit cluster. In a further implementation, the unit data corresponding to the markable are generated as the unit cluster in step 314 and are removed from the database in step 316.

However, if the threshold has not been met, at step 330, the markables in the database may be reviewed. For markables that have not exceeded a predefined time window, (i.e. 2 hours), the process starts again from step 302 with newly ingested data. To illustrate, this may be social media information that is so fresh that other collective users did not get to mention it yet.

However, markables that never grow to the minimum threshold of unit data after a predefined time window (i.e., 2 hours) are removed from the database at step 332. The discarded markables and unit data may be sent to the emitted data store 246 along with other metadata about it. To illustrate, social media information that no other users are mentioning might not be an event of importance to a professional consumer.

Returning to step 314, once the unit cluster is generated, its corresponding markables and unit data are removed from the database in step 316. The newly generated unit cluster is checked against a set of previously generated event detected clusters, at step 318. The set of previously generated event detected clusters may be located in the cluster data store 143. In an alternative implementation, generated clusters may be located in the generated cluster data store 244 of the event processing server 210.

If there is not a match to the set of previously generated event detected clusters, continuing onto step 324, the unit cluster is determined to be a new event detected cluster by the clustering module 128 and is stored into cluster data store 143.

However, if there is a match to existing generated event detected clusters, based on a set of predefined rules, at step 320, a decision to either merge two similar clusters or keep them as two separate clusters is made. In one implementation, the decision to merge may be based on the same underlying concepts.

If the decision is to merge two similar clusters, continuing onto step 322, the cluster module 128 merges the clusters and stores the merged event detected cluster is stored into cluster data store 143. For example, if social media information is the same as a previously detected event, the social media information is then merged with the previously detected event.

However, if the clusters are to remain distinct, continuing onto step 324, the unit cluster is determined to be a new event detected cluster and is stored into cluster data store 143. For example, social media information that is distinct from the previously detected events maybe an event of importance to a professional consumer and should be noted as such, therefore the unit cluster is considered by the clustering module 128 as an event detected cluster.

Figure 3B:
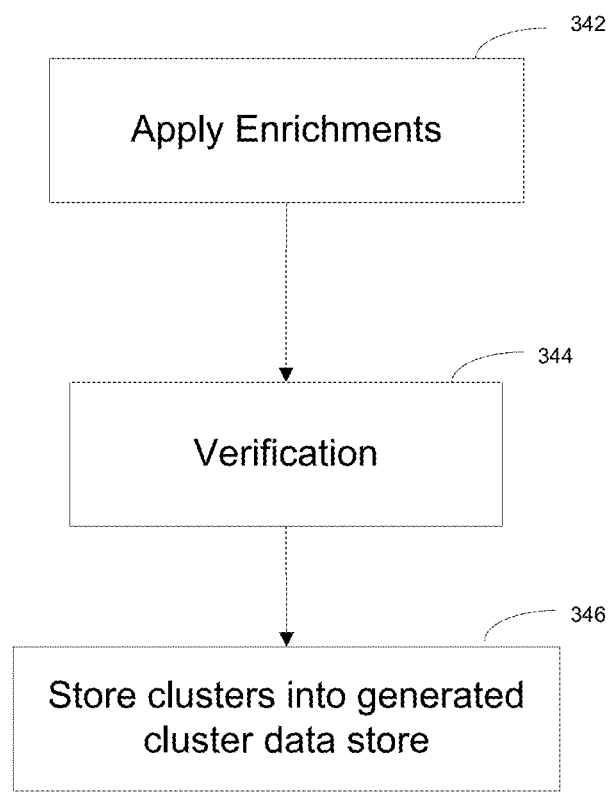
FIG. 3b is an exemplary flow chart of another implementation of the disclosure.

Turning now to FIG. 3b, in a further implementation, upon storing the event detected cluster, at step 342, enrichments may be applied to the event detected cluster. Exemplary enrichments are, but not limited to, topic categorization, summarization, newsworthiness, opinion and credibility.

As mentioned previously, the topic categorization module 131 may determine one or more classification for the event detected cluster. The classification may be a taxonomy of predefined categories (i.e., politics, entertainment). The classification is added to the metadata for the event detected cluster.

The summarization module 132 may select a unit data in the event detected cluster that best describes the cluster. The selected unit data is used as a summary for the event detected cluster. In a further implementation, the summarization module 132 may also utilize metrics such as the earliest unit data or a popular unit data in the generation of the summary for the event detected cluster. The summary is added to the metadata for the event detected cluster.

The newsworthiness module 133 uses a newsworthiness algorithm to calculate a newsworthy score. The newsworthy score is an indication of the importance of the event detected cluster from a journalistic standard. For example, an event detected cluster concerning an airplane crash for a breaking news event is considered more important than a cluster around a viral celebrity picture. In one implementation, the newsworthiness algorithm is a supervised Machine Learning algorithm that has been trained on a newsworthy set of ingested data and predicts a newsworthy score for any ingested data that is passed through it. The newsworthy score is added to the metadata for the event detected cluster.

The opinion module 134 determines if the each unit data in the event detected cluster contains an opinion of a particular person or an assertion of a fact. In one implementation, for unit data that are an assertion of fact, a score indicative of an assertion as a fact is also assigned to the unit data and likewise for an opinion. In a further implementation, the opinion module 134 executes in a two stage process. In the first stage, a rule based classifier is applied that uses simple rules based on presence/absence of certain types of opinion/sentiment words, and/or usage of personal pronouns to identify opinions. In the second stage, all unit data that are indicated to be non-opinions are passed through a bag-of-words classifier that has been trained specifically to recognize fact assertions. The determination of fact or opinion is then stored as a part of the event detected cluster metadata.

The credibility module 135 determines the confidence score of each unit data in the event detected cluster. In one implementation, the confidence score is associated with three components: source credibility, cluster credibility, and tweet credibility. The score and information generated by the components are then stored as a part of the event detected cluster metadata.

Source credibility relates to the source of the unit data. If the source is a credible source, for example, an authority such as the White House stating an event is more credible than a random unknown user. In one implementation, source credibility is measured by an algorithm that uses features like, but not limited to, age of the user, description, and presence of a profile image of the social media account.

Cluster credibility relates to what the information is. Typically, detected events clusters containing genuine events may have different growth patterns from fake detected events clusters, such as a fake event might be driven by negative motivations like purposely spreading rumors. A supervised learning model is used based on historical data that identifies likelihood of the event detected cluster being true or false based on growth patterns.

Tweet credibility relates to the content of the individual tweets in the unit data and the language being mentioned therein. In one implementation, the unit data is evaluated against a set of textual words trained on credible and noncredible unit data.

Next, at step 344, the verification module 150 analyzes the enrichments applied to the event detected cluster and its related unit data to determine the level of accuracy of the event detected cluster. In one implementation, the verification module 150 may generate a veracity calculation based on three categories: user, tweet-level or social media data level and event, from the unit data. In another implementation, the verification module 150 may compute a probability of the propagating rumor being true using extracted language, user and other metadata features from event detected cluster and its related unit data. Verification is explained in greater detail in relation to FIGS. 4a and 4b.

Finally, at step 346, the enriched event detected cluster is then stored in generated cluster data store 244 of the event processing server 210.

FIG. 4a illustrates an exemplary description of categories used in a veracity calculation. The first category for consideration pertains to a user category. In one implementation, the user features 402a are boolean and may include, but are not limited to: name, description, url, location, matches cluster location, witness, protected (i.e., private or not), verified, as illustrated in FIG. 4a. The user category captures user specific information gathered from their social media profile. Exemplary features like location or url can weigh into the credibility of the user. For example, if the user is anonymous for their location, it is hard to determine the accuracy of what they are saying. However, if their location matches the location of the event detected cluster, the incident as gathered from the ingested data might be viewed in a more favorable way as being accurate.

The secondary category for consideration is on the social media level. In one implementation, the social media features 402b of boolean type, may include, but are not limited to: multimedia, elongated word, url and news url, as illustrated in FIG. 4a. The social medial category may further include numerical type: number sentiment positive words, number sentiment negative words, and sentiment score, which is of numerical type. For example, if a user is attaching a picture or multimedia to the reported incident, that can be a clear indication of the accuracy of the reporting on the social media data. In another example, the type of words used by the user, especially elongated words, i.e. "OMMMMMGGG!!" might convey the user's shock related to the event and lend itself to a more credible event. However, if the user uses a url in the social media data, the user might be sharing by reiteration. In a further implementation, the sentiment of the ingested data is also examined. The ingested data may be checked against a set of positive and negative words for an indication of the sentiment. As an example, if the event detected cluster pertains to a disaster, the general tone of the ingested data should be negative.

The third category for consideration is event features. In one implementation, the event features 402c may include: event topic, which may be categorical type, and highest retweet count, retweet sum, hashtag sum, negation fraction, support fraction, question fraction, which may be of numerical type, as illustrated in FIG. 4a. In one implementation, if the ingested data are twitter tweets, the retweeting count and sum are valued, with the assumption that the count correlates to the popularity of the event which weighs more in favor of being accurate. In another implementation, hashtags may also be an indicator of the event. For example, sports related ingested data may contain many hashtags, while a disaster related ingested data may not have many hashtags, as there might not be time to list so many hashtags when a disaster is unfolding at the location of the user. In yet another implementation, the algorithm also takes into consideration the fraction of ingested data that deny, believe or question the event.

The verification module 150 generates a matrix that is aggregated based on the three categories to generate a veracity score between −1 to 1, ranging from a false rumor to a true story. In one implementation, as illustrated in FIG. 5n, the veracity score 550 may be added to the metadata of the event detected cluster. In a further implementation, as illustrated in FIG. 6b, the veracity score 614 may be presented to the user in the form of circle representations.

Figure 4B:
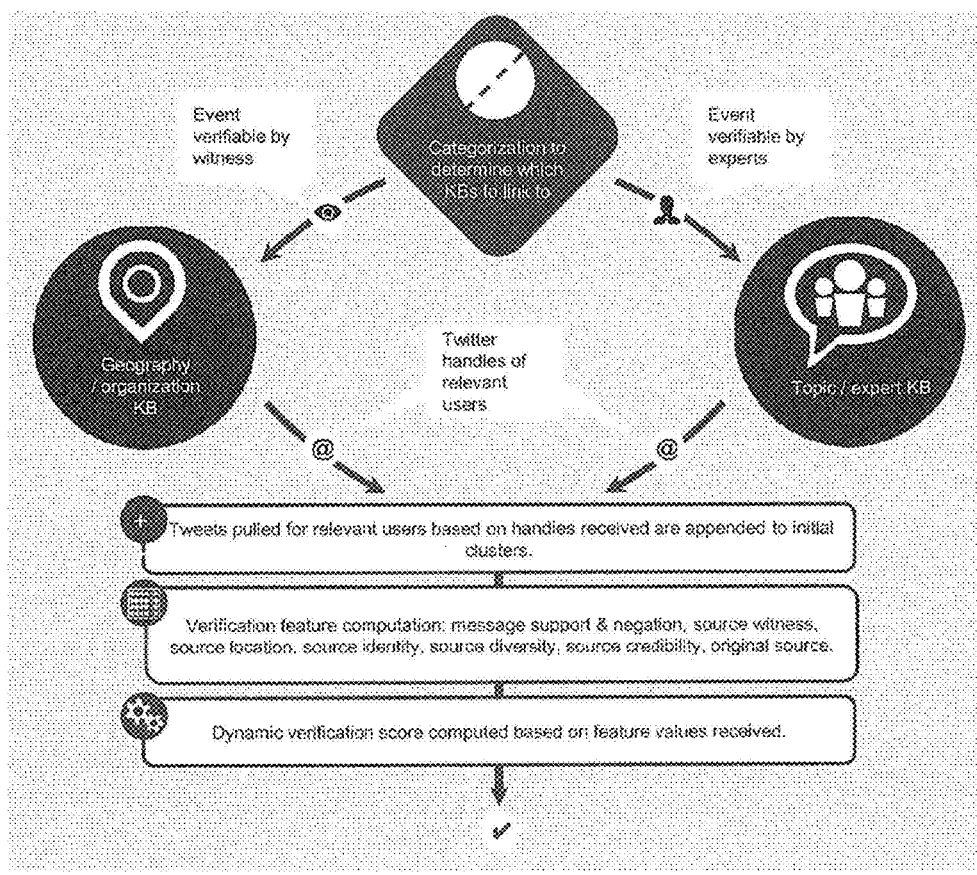
FIG. 4b illustrates exemplary elements in an alternative verification calculation.

FIG. 4b illustrates the determination by the verification module 150 a probability score for the event detected cluster being true based on information collected from social media. In the FIG. 4b example, Twitter is used as an exemplary social media platform. In one implementation, the verification module 150 first determines if the unit data of the event detected cluster is an expert type assertion or a witness type assertion.

Expert type assertions are assertions that likely to be made only by people or organizations that are considered authoritative for that assertion. An exemplary expert type assertion may be the company Apple® asserting that they will be releasing a new iPhone®. The verification module 150 may invoke the knowledge base module 152 to determine if the identified user of the unit data (i.e., Apple®) is a credible source and awards a higher score if the unit data is originating from a credible source.

In a further implementation, if the user of the unit data is from the list of credible sources determined by the knowledge base module 152 as authoritative on that topic, then a higher score is given. If the user of the ingested data is not authoritative, then other experts and their recent tweets are considered by the knowledge base module 152 to collect or negate the user assertion.

Witness type assertions are assertions any random user may potentially make. These include crises type of events (for example, User 123 assets that an explosion took place in a particular area.) In one implementation, the verification module 150 compares either the topic or the geography of the unit data against other unit data from the same geographic area. If other users are not mentioning the same assertion during the same time period, then a lower score may be assigned.

In yet a further implementation, a knowledge base of organizations as determined by the knowledge base module 152 may also be considered. Social media data from the collective knowledge base of organizations may also be processed by the Event Detection Server 110 to determine if they are discussing about a similar assertion and are used to compare with the current unit data to determine level of authenticity.

The verification module 150 may then assign a probability that indicates its likeliness to be true or false. In one implementation, the verification module may algorithmically compute a score between −1 and 1, where 0 is neutral depicting our lack of information in the matter, 1 depicts highest level of confidence in the assertion being true and −1 being the highest level of confidence in it being false. For example, if information from very credible sources have confirmed that an assertion is true, then its score is likely 1. However for cases that we cannot find concrete evidences for near accuracy of its authenticity or truthfulness, the score will then fall between −1 and 1 depending on the type of evidences collected. The confidence may be re-evaluated when new evidences are included in its assessment.

Figures 5A, 5B, 5C:

Referring now to FIG. 5a, an exemplary ingested data is illustrated. In one implementation, the ingested data may be but is not limited to a tweet. The organization module 126 analyzes semantic and syntactic structures in the ingested data to identify key concepts. In this example, terms 502a-502d, such as "confederate flag" "rally" "Linn Park" "Birmingham" are identified key concepts by organization module 126. Although four key concepts are identified in this example, there may be n number of terms identified by the organization module 126. In one implementation, the key concepts are stored in a database 500, with the key concepts designated as a "markable" and the corresponding originating ingested data as a "unit data", as illustrated in FIG. 5b. As shown in FIG. 5b, there may be a column 504 for n number of markables, each with corresponding column 506 pertaining to n number of unit datas. In one implementation, the database may be a hash table or a hashmap.

Turning to FIG. 5c, an example of the database using information from FIG. 5a is disclosed. In this example, the ingested data in FIG. 5a is represented as Unit data 1. The identified key concepts 502a-502d are listed as markable 508a-508d in the markable column 504, and the originating ingested data as Unit data 1 is also noted in the corresponding column 506. As additional ingested data are processed in accordance with steps 302-310 of FIG. 3a, each xth ingested data is represented as "Unit data x". For example, the second ingested data may be represented as "Unit data 2". If "Unit data 2" also contains the markable "Linn Park", it may be added to the row for Linn Park in the database 500 and "Unit data 2" will be noted along with "Unit data 1" in the corresponding column 506. Once the unit data for a markable grows and reaches a predefined threshold, it is then emitted as an event detected cluster. To put it a different way, this is an indication that multiple users are reporting similar events and therefore, may be an emerging event.

Figure 5D:
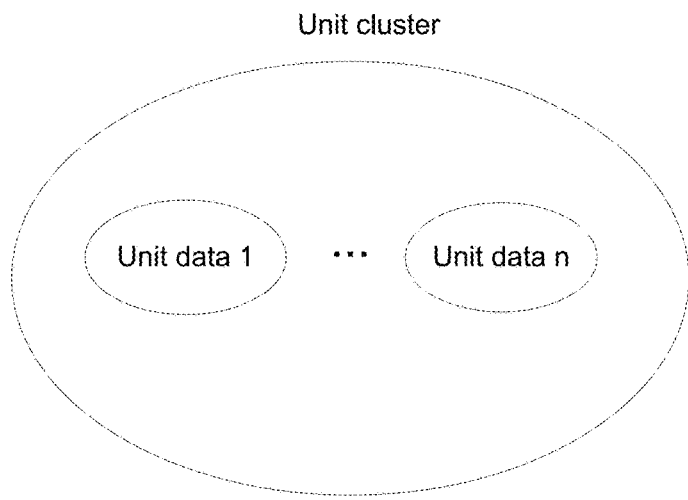
FIG. 5d illustrates an example unit cluster.

Turning to FIG. 5d, an exemplary unit cluster is illustrated. In one implementation, the unit cluster becomes the event detected cluster if the clustering module 128 determines that there is not already an existing cluster, or if there is an existing cluster but based on predetermined rules, the clustering module 128 determines not to merge with an existing cluster. The unit cluster comprises a threshold number n of n unit data (e.g., 3 unit clusters).

Figure 5E:
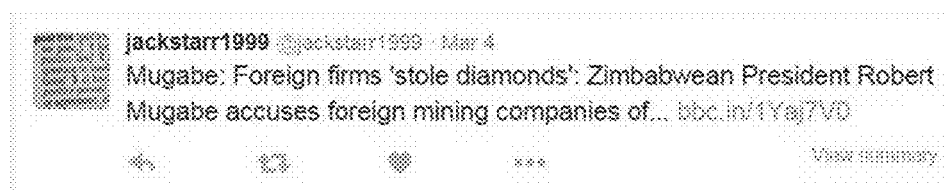
FIG. 5e illustrates an exemplary ingested data.

FIG. 5e is another exemplary ingested data in the form of a tweet. This ingested data is one of the many unit data from an exemplary event detected cluster pertaining to "Mugabe: Foreign firms 'stole diamonds': Zimbabwean President Robert Mugabe accuse foreign mining companies of . . . ". This ingested data was also selected by the summarization module 132 as a representative summary of the event detected cluster.

FIGS. 5f-5k are exemplary metadata of ingested data in FIG. 5e. The ingested data comprises default metadata generated by the social media platform (i.e, twitter metadata) as illustrated in FIGS. 5f-5h and 5k. The Event Detection Server generates additional metadata and is appended to metadata of ingested data described above, and is illustrated in FIGS. 5i and 5j.

Referring now to FIG. 5i, the added metadata includes, but is not limited to, the credibility score 535 as determined by the credibility module 135; the opinion score 534 as determined by the opinion module 134; the profanity indicator 524 as determined by filtering module 124 and the markables 526 as determined by organization module 126.

FIGS. 5l-5n are an exemplary metadata of an event detected cluster with ingested data of FIG. 5e as one of the related unit data.

In FIG. 5l-5m, the cluster metadata includes, but is not limited to, the newsworthiness score 533 as determined by newsworthiness module 133; the topic 531 as determined by topic categorization module 131; the summary 532 as determined by summarization module 132 and markables 504a as identified in the unit data by the organization module 126 and selected to form the event detected cluster. Each markables 504a may also include the respective unit data 506a information.

Continuing on to FIG. 5n, the cluster metadata includes, but is not limited to, unit data 506b forming the event detected cluster and the veracity score 550 as computed by verification module 150.

Figure 6A:
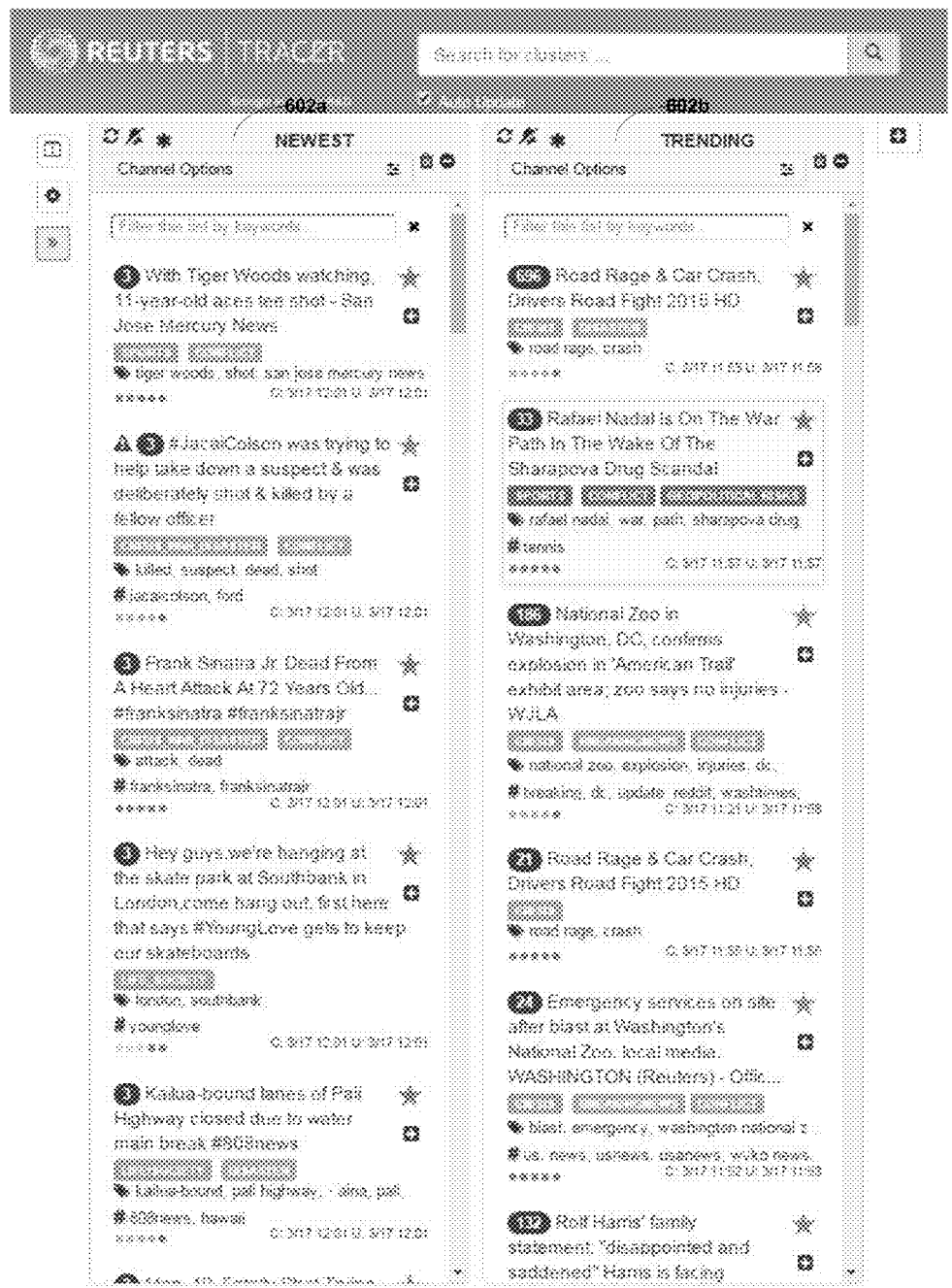
FIG. 6a illustrate default event detected clusters viewable through an exemplary graphical user interface (GUI)
Figure 6B:
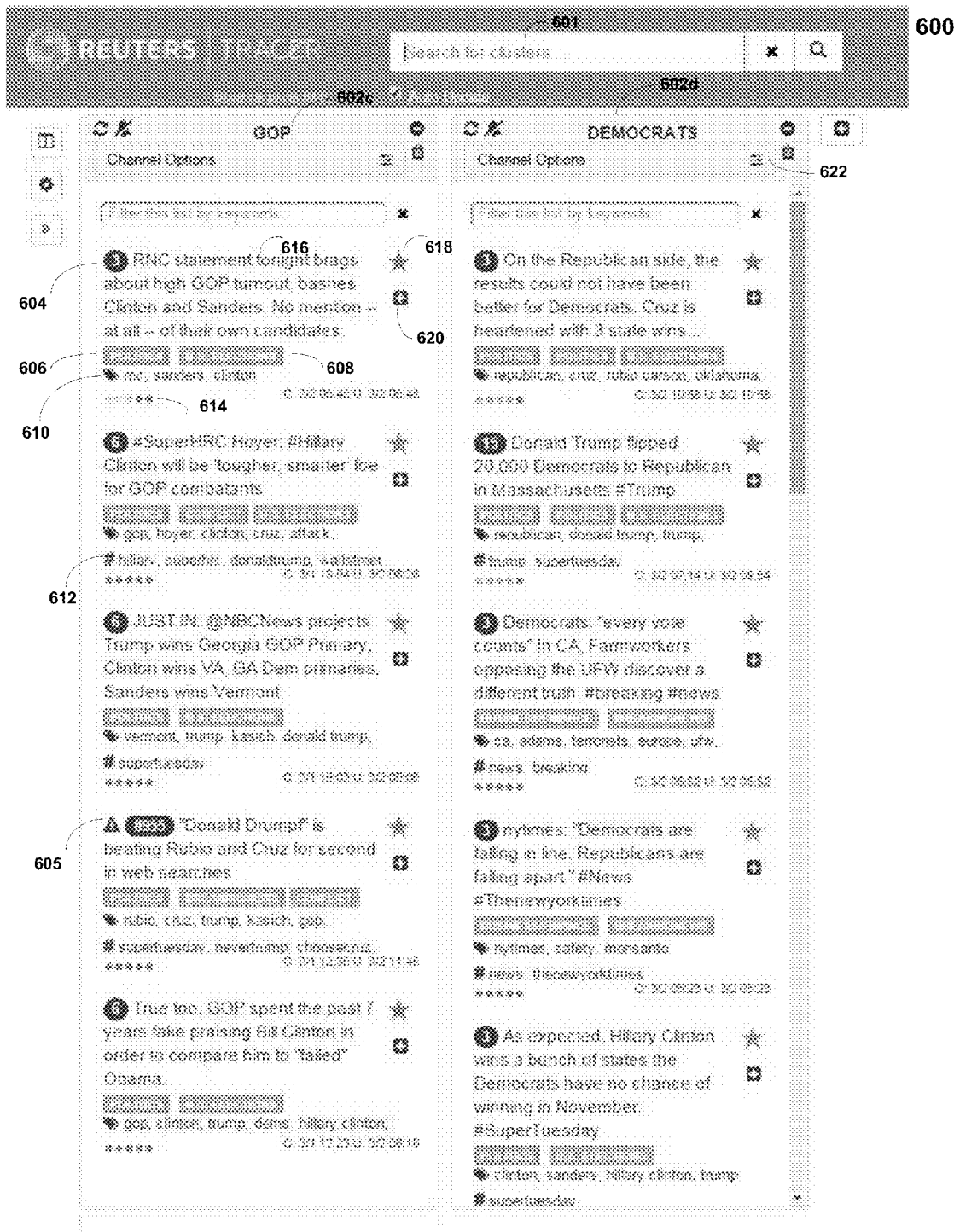
FIG. 6b illustrate exemplary event detected clusters viewable through an exemplary graphical user interface (GUI)

Now turning to FIG. 6a, an exemplary graphical user interface (GUI) available through a browser 172 of access device 170 is disclosed. In one implementation, the browser 172 includes an application interface 600 that includes a plurality of columns for viewing of a list of event detected clusters pertaining to channels 602. Within each channel are the event detected clusters relating to the topic of the channel.

In one implementation, in the FIG. 6a example, there may be channel 602a for "newest" and another channel 602b for "trending". However, although only two channels are presented on the application interface 600 to the user in this example, there may be n number of channels displayed on the application interface 600. The default channels provided by the application interface 600 allow the user to be notified of events that might be new or trending without having to search by key terms.

In another implementation, continuing onto FIG. 6b, a user through the browser 172 of access device 170 may enter a search term in search field 601 to tailor the application interface 600 to their needs. The UI module 232 of Event Processing Server 210 will then retrieve any event detected clusters matching the user's search term from the generated cluster datastore 244. The results are rendered by the UI module 232 and presented to the user through browser 172 under channel 602a of program interface 600, with the channel representing the search term. As shown in FIG. 6b example, channel 602c representing the search term "GOP" and channel 602d for "Democrats" may be presented for viewing.

In one implementation, the indication 604 provided before the text of the event detected cluster depicts the number of unit data in the event detected cluster. In a further implementation, there may be additional designation 605 indicating the event detected cluster importance based on the topic to a professional consumer (e.g. topic relating to crises, conflicts (political or geopolitical) or criminal activity).

In a further implementation, the event detected cluster may also be presented with the topic 606 as determined by topic categorization module 131; categories 608 which may be customized terms; summary 616 as determined by summarization module 132. The event detected cluster may also contain concepts 610, which are the markables from the unit data that formed the event detected cluster, as determined by organization module 126.

The event detected cluster may further be presented with the hashtags 612 used in the ingested data as detected by the organization module 126, newsworthiness indication 618 as determined by newsworthiness module 133. In one implementation, newsworthiness indication 618 might be depicted as a filled in star.

The event detected cluster may also be presented with veracity score 614 as determined by verification module 150. In one implementation, the veracity score may be in the form of filled-in circles indicative of the strength of the veracity determination, with 5 solid circles as near accurate.

In yet another implementation, the user may select create new channel 620 based on concepts in an event detected cluster. The newly created channel is based on identified concepts 610.

Figure 6C:
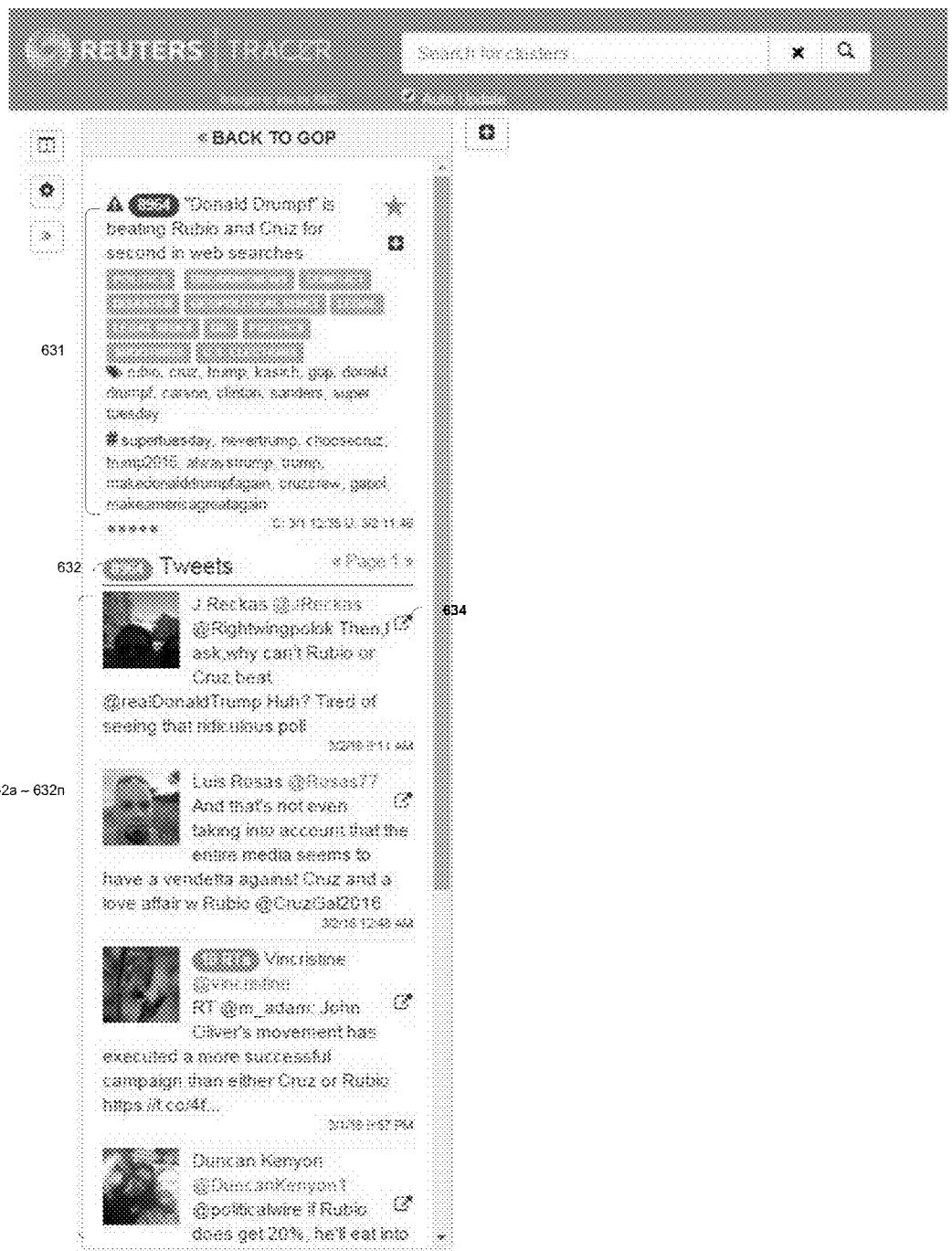
FIG. 6c illustrate a selected event detected cluster viewable through an exemplary graphical user interface (GUI)

Using the critical event detected cluster as an example, the selection of the cluster is illustrated in FIG. 6c. The set of unit data 632a-632n corresponding to the selected event detected cluster 631 is presented. In a further implementation, the user may utilize link 634 to view a specific unit data.

Returning back to FIG. 6b, in another implementation, channel options 622 allows for filtering of the event detected cluster results presented by UI module 232 onto browser 172 of the access device 170. The UI module 232 receives the filter designation as selected by the user in the application interface 600 and processes the request in accordance with the filters illustrated in relation to FIG. 7a-7e.

Figure 7A:
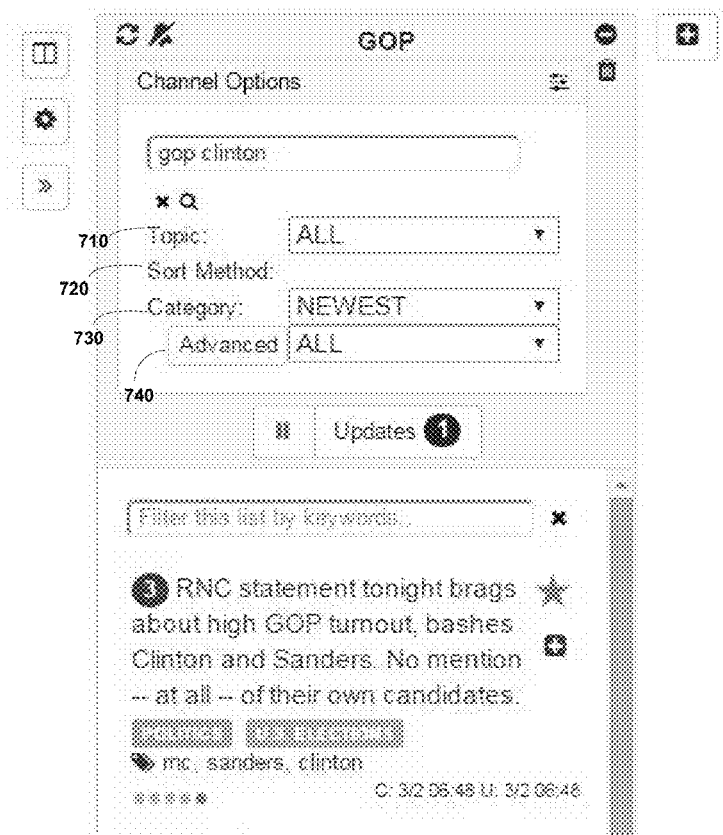
FIG. 7a-7e illustrate additional filters on event detected clusters available through an exemplary graphical user interface (GUI).

In one implementation, as shown in FIG. 7a, filtering is available based on topic 710, sort method 720, category 730 and advance 740 filtering.

Figure 7B:
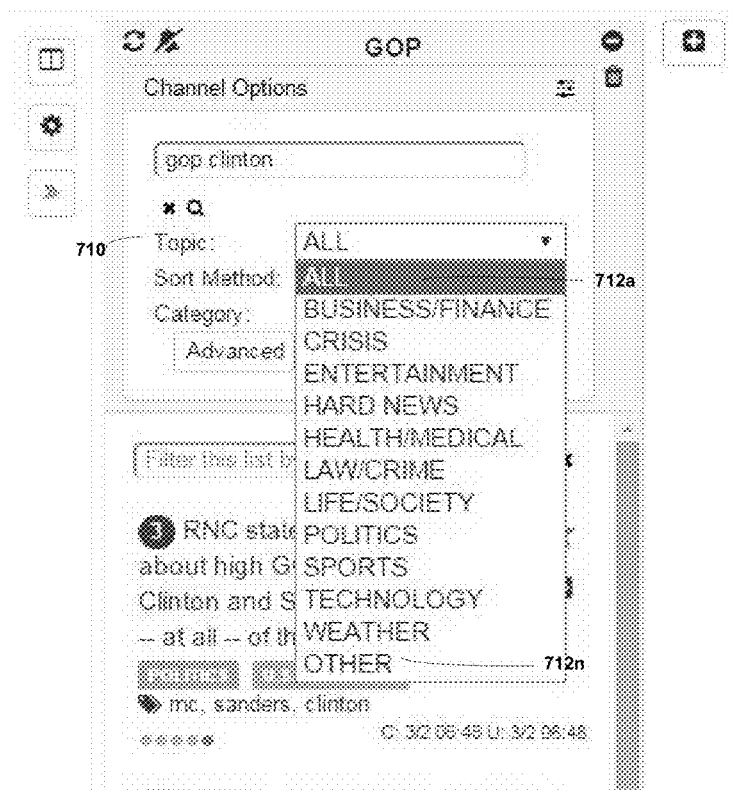

FIG. 7b illustrates an exemplary topic filter 710. The topic filter 710 contains list of topic filters 712a-712n. They may be, but not limited to, topics pertaining to: business/finance, crisis, entertainment, hard news, health/medical, law/crime, life/society, politics, sports, technology, weather, or other as identified by the topic categorization module 131.

Figure 7C:
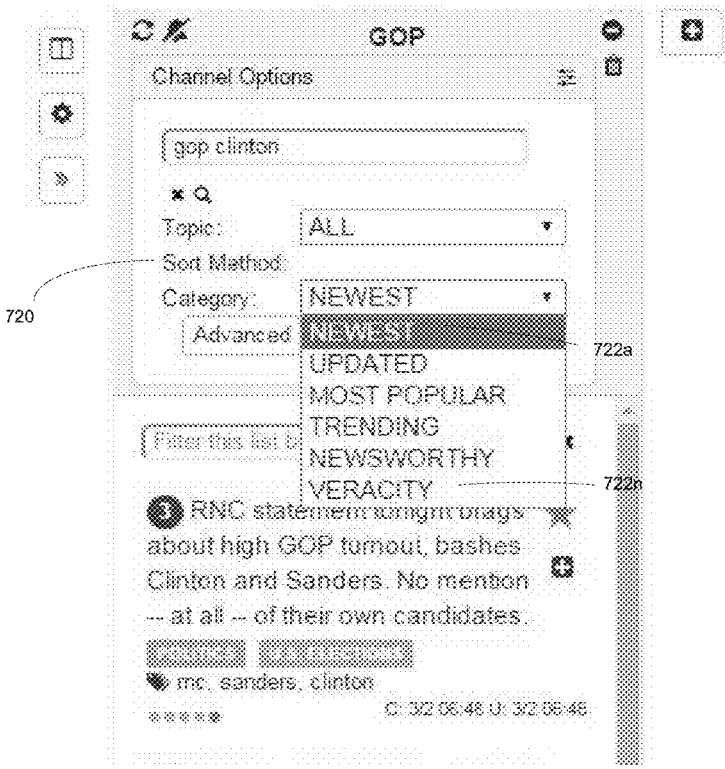

FIG. 7c illustrates an exemplary sort filter 720. The sort filter 720 contains options 722a-722n and they may be but are not limited to sorting by: newest, updated, most popular, tending, newsworthy, and veracity.

Figure 7D:
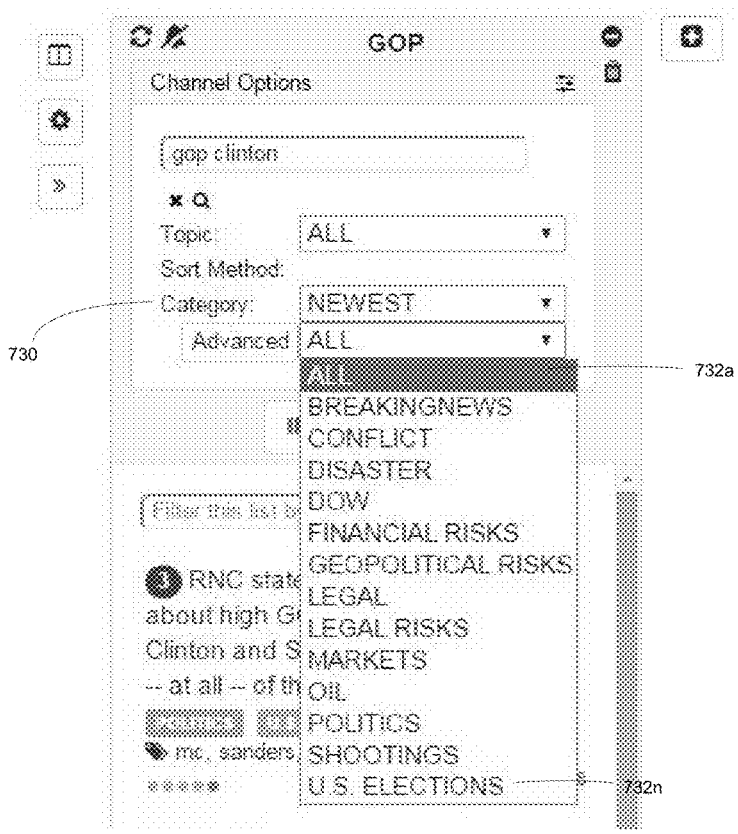

FIG. 7d illustrates an exemplary category filter 730. The category filter 730 contains a list of category filters 732a-732n. The category options may be but are not limited to: breaking news, conflict, disaster, dow, financial risks, geopolitical risks, legal, legal risks, markets, oil, politics, shootings, U.S. elections.

Figure 7E:
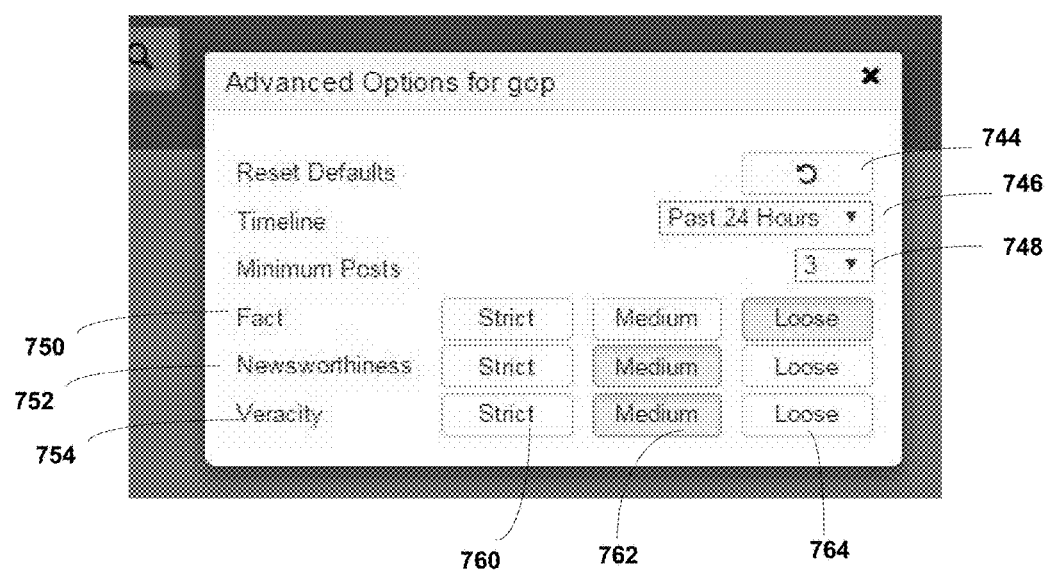

FIG. 7e are the advanced options upon selection of advance 740 on application interface 600. In one implementation, the advance options for the selected channel may be, reset defaults 744, timeline 746 with a time frame selection, minimum posts 748 count, and three levels of strict 760, medium 762 or loose 764 for fact 750, newsworthiness 752 and veracity 754.

FIGS. 1 through 7e are conceptual illustrations allowing for an explanation of the present disclosure. Various features of the system may be implemented in hardware, software, or a combination of hardware and software. For example, some features of the system may be implemented in one or more computer programs executing on programmable computer. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such.

What is claimed is:

1. A system comprising:
an event detection server including a processor and memory storing instructions that, in response to receiving social media data from at least one data source, cause the processor to:
apply a set of filter modules to the social media data to generate a data store, the data store comprising a set of identified concepts and corresponding attributes of the social media data;
select one of the set of identified concepts from the data store using a corresponding threshold value associated with the attributes of the social media data, wherein the corresponding threshold value is associated with three or more distinct attributes of the social media data related to the identified concept and wherein one of the attributes of the social media data is an authorship value and the corresponding threshold value represents at least three or more similar identified concepts associated with different authorship values;
generate an event detected cluster using the selected identified concept;
generate a verification score for each item of social media data associated with the event detected cluster, the verification score being indicative of a veracity of the event detected cluster, wherein the verification score is determined by analyzing at least a user category, a social media category and an event features category relating to each item of social media data associated with the event detected cluster; and
present the event detected cluster and verification score.

2. The system of claim 1, wherein the memory stores instructions that, in response to receiving the social media data, cause the processor to delete the selected identified concept from the data store.

3. The system of claim 1, wherein one of the set of filter modules detects language of the social media data and deleting the social media data that is not in English.

4. The system of claim 1, wherein one of the set of filter modules detects profanity used in the social media data and removes the social media data containing the detected profanity.

5. The system of claim 1, wherein one of the set of filter modules detects at least one of spam, chat and advertisement in the social media data and removing the social media data that contains the at least one detected spam, chat and advertisement.

6. The system of claim 1, wherein one of the set of filter modules applies Parts-Of-Speech tagging of the social media data.

7. The system of claim 1, wherein one of the set of filter modules analyzes semantic and syntactic structures in the social media data to determine identified concepts in the social media data.

8. The system of claim 1 further comprising a topic categorization module configured to generate a topic classification for the event detected cluster.

9. The system of claim 1 further comprising a summary module configured to generate a summary for the event detected cluster.

10. The system of claim 1 further comprising a newsworthiness module configured to generate a newsworthy score for the event detected cluster.

11. The system of claim 1 further comprising an opinion module configured to identify opinion or fact for each item of social media data associated with the event detected cluster.

12. The system of claim 1 further comprising a credibility module configured to generate a credibility score for each item of social media data associated with the event detected cluster.

13. The system of claim 1, further comprising an event processing server configured to present the event detected cluster and the verification score to the user on a graphical user interface.

14. The system of claim 1, wherein the user category comprises at least one of name of author, description of author, URL of author, location of author, location of the author matching the location of the event, author being a witness to the event, protection level of the author's account, or verification of the author.

15. The system of claim 1, wherein the social media category comprises at least one of multimedia, url, elongated word, url from news source, or word sentiment associated with the social medial data.

16. The system of claim 1, wherein the event features category comprises at least one topic of the event and portion of the social media that deny, believe or question the event associated with each item of the social media data.

17. The system of claim 1, wherein the social media category is twitter data and the event features category further comprises at least one of a count of the most retweeted tweets, a frequency of retweeted tweets or a frequency of hashtags associated with each item of the social media data.

18. A computer-implemented method for detecting an event in social media, the method comprising:
  receiving, by an event detection server, social media data from at least one data source;
  applying, by the event detection server, a set of filter modules to the social media data to generate a data store, the data store comprising a set of identified concepts and corresponding attributes of the social media data;
  selecting, by the event detection server, one of the set of identified concepts from the data store using a corresponding threshold value associated with the attributes of the social media data, wherein the corresponding threshold value is associated with three or more distinct attributes of the social media data related to the identified concept and wherein one of the attributes of the social media data is an authorship value and the corresponding threshold value represents at least three or more similar identified concepts associated with different authorship values;
  generating, by the event detection server, an event detected cluster using the selected identified concept;
  generating a verification score for each item of social media data associated with the event detected cluster, the verification score being indicative of a veracity of the event detected cluster, wherein the verification score is determined by analyzing at least a user category, a social media category and an event features category relating to each item of social media data associated with the event detected cluster;
  presenting the event detected cluster and verification score.

19. The method of claim 18 further comprises presenting the event detected cluster and the verification score to the user on a graphical user interface.

20. The method of claim 18 wherein the user category comprises at least one of name of author, description of author, URL of author, location of author, location of the author matching the location of the event, author being a witness to the event, protection level of the author's account, or verification of the author.

21. The method of claim 18 wherein the social media category comprises at least one of multimedia, url, elongated word, url from news source, or word sentiment associated with the social medial data.

22. The method of claim 18 wherein the event features category comprises at least one topic of the event and portion of the social media that deny, believe or question the event associated with each item of the social media data.

23. The method of claim 18 wherein the social media category is twitter data and the event features category further comprises at least one of a count of the most retweeted tweets, a frequency of retweeted tweets or a frequency of hashtags associated with each item of the social media data.

* * * * *